United States Patent
Whalen

(10) Patent No.: US 9,631,969 B1
(45) Date of Patent: Apr. 25, 2017

(54) HIGH VISIBILITY ON BOARD DIGITAL, SEMI-TRAILER SCALE

(71) Applicant: Denny Whalen, Lyle, MN (US)

(72) Inventor: Denny Whalen, Lyle, MN (US)

(*) Notice: Subject to any disclaimer, the term of this patent is extended or adjusted under 35 U.S.C. 154(b) by 110 days.

(21) Appl. No.: 14/605,507

(22) Filed: Jan. 26, 2015

Related U.S. Application Data

(60) Provisional application No. 61/931,760, filed on Jan. 27, 2014.

(51) Int. Cl.
| | |
|---|---|
| *G01G 19/02* | (2006.01) |
| *G01G 19/08* | (2006.01) |
| *G01G 19/10* | (2006.01) |
| *B60G 11/27* | (2006.01) |
| *G01G 5/00* | (2006.01) |

(52) U.S. Cl.
CPC .............. *G01G 19/02* (2013.01); *B60G 11/27* (2013.01); *G01G 19/08* (2013.01); *G01G 19/10* (2013.01); *G01G 5/006* (2013.01)

(58) Field of Classification Search
CPC ........ G01G 5/006; G01G 19/08; G01G 19/10; G01G 19/02; B60G 11/27
See application file for complete search history.

(56) References Cited

U.S. PATENT DOCUMENTS

| | | | | |
|---|---|---|---|---|
| 4,651,838 A | * | 3/1987 | Hamilton | B60G 17/0155 177/141 |
| 4,783,089 A | * | 11/1988 | Hamilton | B60G 17/0155 280/5.514 |
| 4,854,407 A | * | 8/1989 | Wagner | G01G 19/10 177/1 |
| 5,119,895 A | * | 6/1992 | Gradert | B60G 17/0155 177/141 |
| 5,167,289 A | * | 12/1992 | Stevenson | G01G 19/08 177/141 |
| 5,391,843 A | * | 2/1995 | Sato | G01G 19/10 177/141 |
| 5,610,372 A | * | 3/1997 | Phillips | G01G 19/086 177/1 |
| 5,748,974 A | * | 5/1998 | Johnson | G06F 3/038 704/9 |
| 5,780,782 A | * | 7/1998 | O'Dea | G01G 23/01 177/136 |
| 5,780,783 A | * | 7/1998 | Heider | G01G 19/10 177/137 |

(Continued)

*Primary Examiner* — Randy Gibson
(74) *Attorney, Agent, or Firm* — Peter J. Ims; Westman, Champlin & Koehler, P.A.

(57) ABSTRACT

A scale for mounting on a semi-trailer having an air bag in the suspension and an air line connected to the air bag includes a pressure transducer for connecting to the air line and measuring the pressure in the air bag, and to send a signal correlated to the sensed pressure, a process module in electric communication with the pressure transducer and configured to receive the signal therefrom wherein the process module is configured to correlate the signal from the pressure transducer to a weight of a load on the trailer, and a display module configured to receive a signal from the process module indicating the sensed weight and display the sensed weight of the load on the semi-trailer. A method for monitoring weight includes converting pressure in the air line to a weight of the semi-trailer, which can be monitored in real-time.

15 Claims, 6 Drawing Sheets

(56) References Cited

U.S. PATENT DOCUMENTS

| | | | | |
|---|---|---|---|---|
| 6,025,563 A * | 2/2000 | Lesesky | ................... | G01G 5/04 |
| | | | | 177/136 |
| 6,307,164 B1 * | 10/2001 | Campbell | .............. | G01G 5/006 |
| | | | | 177/141 |
| 6,921,100 B2 * | 7/2005 | Mantini | ............... | B60G 17/005 |
| | | | | 177/137 |
| 7,572,988 B1 * | 8/2009 | Morton | ................. | G01G 19/10 |
| | | | | 177/137 |
| 8,424,892 B2 * | 4/2013 | Hapyuk | .............. | B60G 17/018 |
| | | | | 177/136 |
| 2004/0178005 A1 * | 9/2004 | Carlstrom | .............. | G01G 19/08 |
| | | | | 177/139 |
| 2012/0046908 A1 * | 2/2012 | Campbell | .............. | G01G 19/10 |
| | | | | 702/174 |
| 2013/0081883 A1 * | 4/2013 | Yang | ...................... | G01G 19/10 |
| | | | | 177/1 |
| 2015/0251515 A1 * | 9/2015 | Joachim | ................ | B60G 11/27 |
| | | | | 280/5.514 |

* cited by examiner

HIGH VISIBILITY ON BOARD DIGITAL, SEMI-TRAILER SCALE

CROSS REFERENCE TO RELATED APPLICATION

This application is a non-provisional application claiming priority to U.S. Provisional Application Ser. No. 61/931,760, entitled "ON BOARD SEMI-TRAILER SCALE", filed Jan. 27, 2014, which is hereby incorporated by reference in its entirety.

SUMMARY

The present invention relates to an on board scale that is mounted to a semi-trailer. More particularly the present invention relates to an on board scale that correlates the air pressure in an air bag used in the suspension of a semi-trailer to the weight of a load carried by the trailer.

BACKGROUND OF THE INVENTION

Semi-trailers are used in commerce for many purposes to transport goods throughout the country. Semi-trailers are also used by many farmers to transport harvested crops from a field to a storage facility.

Due to the density and weight of the load in a semi-trailer, for example a load containing crops, many times the load carried by the semi-trailer can exceed that of the weight limits of roads. When a load on a trailer exceeds the weight limit, the roads can become damaged and it could be dangerous to transport the load. Further, a driver can be subjected to a fine for any overage above the weight limit of a road.

As such, it is desirable to be able to determine the weight of a load on a semi-trailer while the semi-trailer is being filled so that the semi-trailer can be filled to its maximum capacity while still being within the weight limits for the road. Therefore, when the semi-trailer is loaded to a legal limit, the trailer does not damage the road and prevents the driver from being subjected to a fine.

SUMMARY

The present disclosure relates to an on board semi-trailer where the semi-trailer includes an air bag that is used in the suspension of the semi-trailer. A pressure transducer is attached to the bleed line from the air bag where the pressure transducer converts the air pressure in the air bag to an electric signal. The electric signal is then transmitted through a two wire module to a processing module. The processing module is preprogrammed to correlate the electric signal from the pressure transducer to a weight of the load within the semi-trailer. The process module then sends a signal to a display module that displays the weight of the load on the trailer.

DETAILED DESCRIPTION

Figure 1:
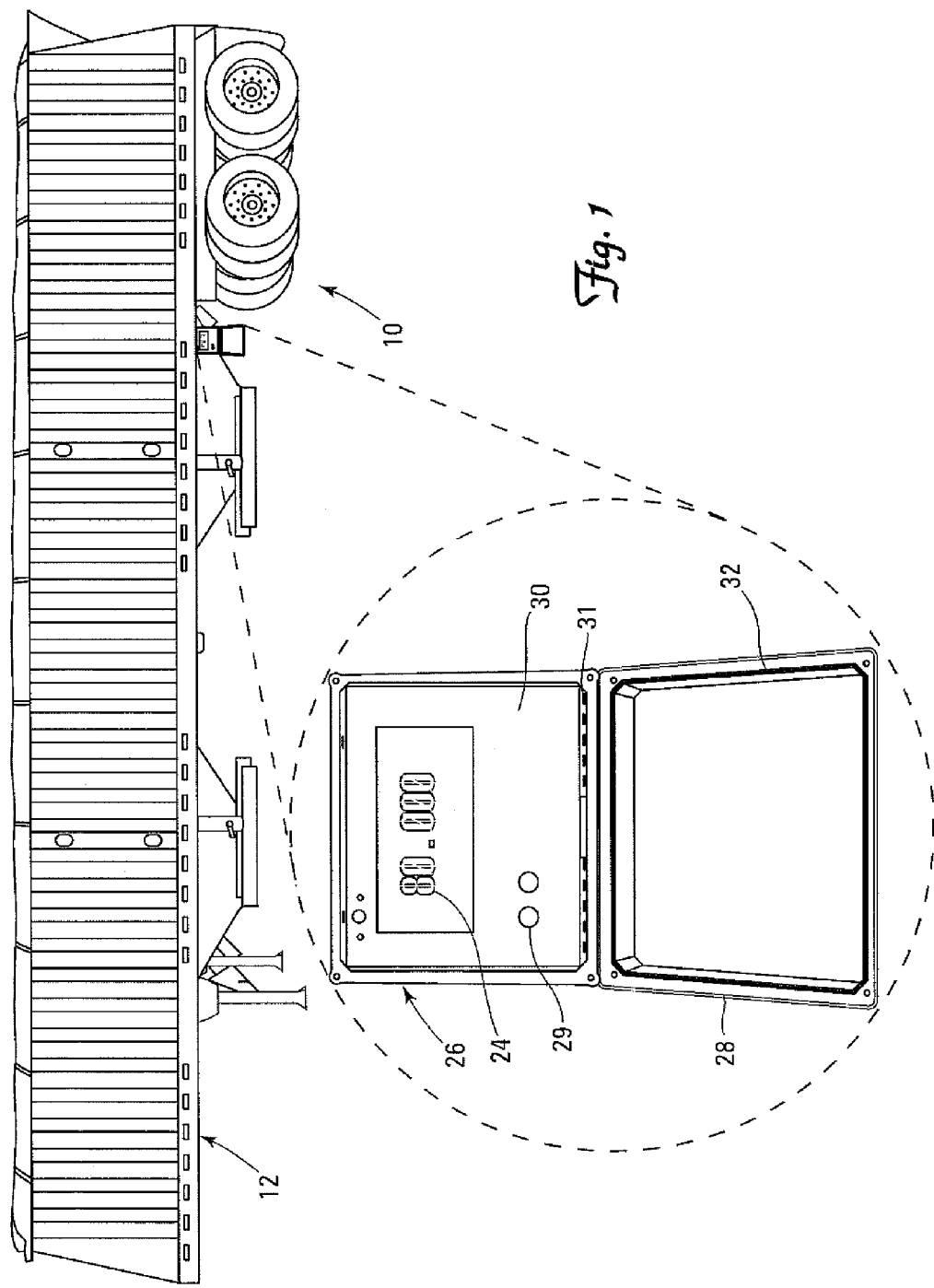
FIG. 1 is a schematic view of a semi-trailer with a scale according to an embodiment of the present disclosure attached thereto.
Figure 2:
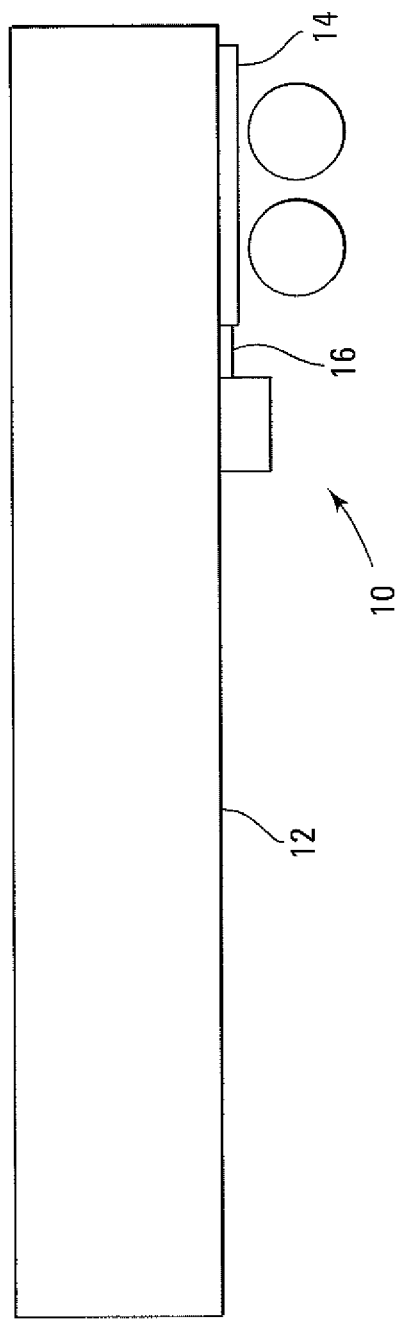
FIG. 2 is a plan view of a semi-trailer with an air bag and scale according to an embodiment of the disclosure attached thereto.

A semi-trailer with an onboard scale is generally depicted at 10 in FIG. 1. Referring to FIGS. 1 and 2, the semi-trailer 12 includes an airbag 14 that is utilized as part of the suspension of the semi-trailer 14.

The air bag 14 has a fixed amount of air within the air bag when a load is placed on the semi-trailer 12. Due to the nature of a gas such as air, as the volume of a container is decreased, the pressure in the container, being inversely proportional to the volume, increases. Otherwise stated, as the volume of the volume of the air bag 14 decreases due to the loading of goods onto the semi-trailer 12, the pressure in the air bag 14 increases. As such, the pressure in the air bag 14 can be measured and correlated to the weight of a load on the semi-trailer 12.

Figure 3:
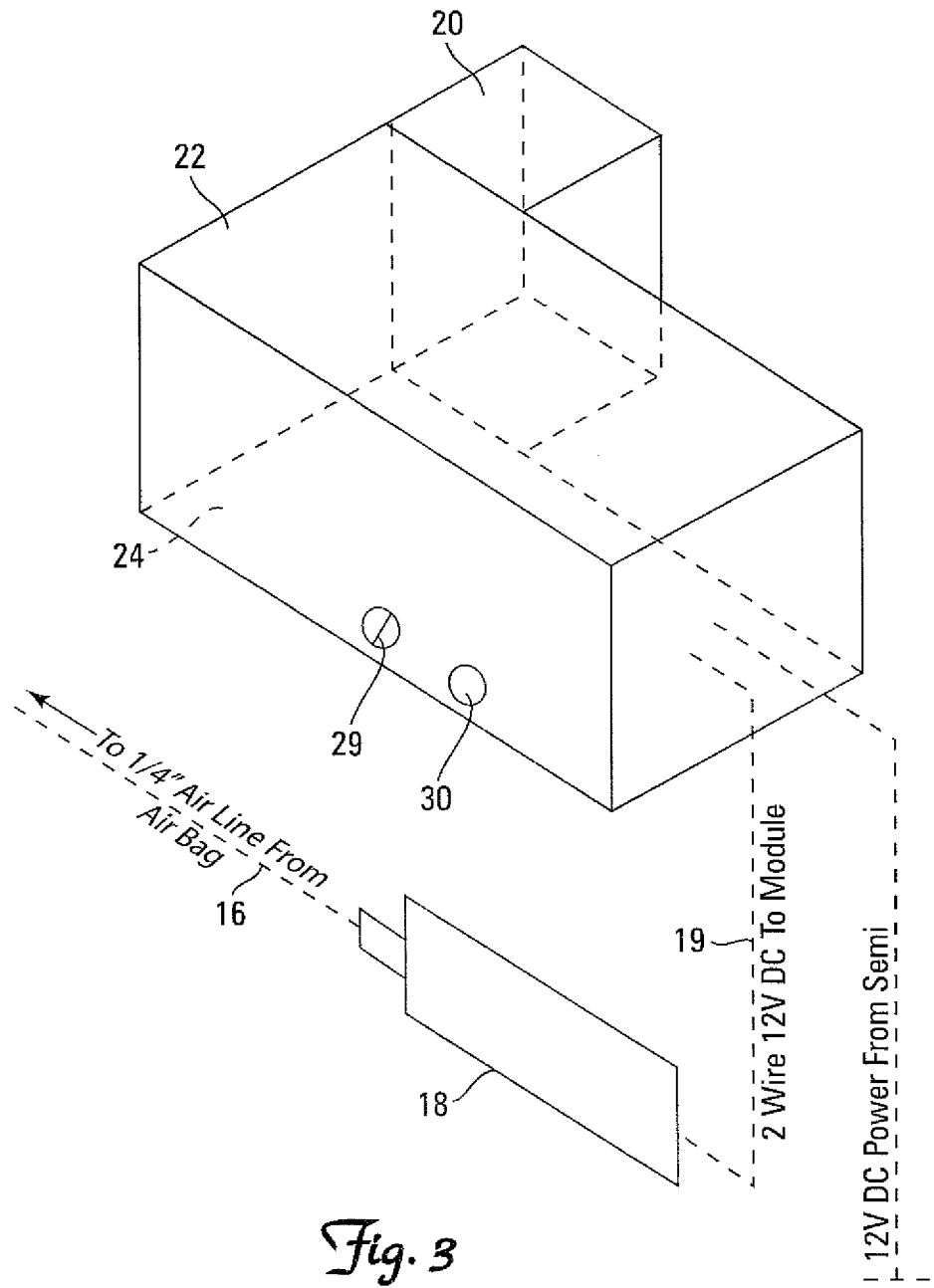
FIG. 3 is a schematic view of the scale and pressure transducer for measuring the weight of a load on a semi-trailer according to an embodiment of the present disclosure.

Referring to FIGS. 1-3, to measure the pressure in the air bag 14, a pressure transducer 18 is attached to an air line 16 where the pressure transducer 18 measures the pressure of the air within the air line 16, and hence the air bag 14, and converts the pressure to a 4 to 20 milli-Ampere (mA) signal. The air line 16 is typically about one quarter of an inch in diameter and is typically used to bleed pressure from the air bag 14. However, other sized air lines are also contemplated. A pressure transducer suitable for the present application includes pressure transducer Model Number PT100PSIG-13-L13-H1131 manufactured by Turck, Inc. located in Minneapolis, Minn.

The 4 to 20 mA signal travels along a two wire line 19 to a process module 20. The process module 20 is calibrated to correlate the mA signal transmitted from the pressure transducer 18 to an actual weight of the load within the semi-trailer 14. One such process module is Model No. MPAXP010 manufactured by Red Lion Controls located in York, Pa.

A signal correlating the actual weight of the load on the semi-trailer 14 is sent from the process module 20 to a display module 22 which displays the actual weight of the load. The display module 22 includes a display panel 24 that is relatively large and has bright numbers that can be easily seen by a person loading the semi-trailer 12.

In one embodiment, power is supplied to the display module 22 and the process module 20 through a 12 volt direct current (DC) power supply that is typically provided through an electric connection from a battery located on the semi-tractor. However, it is also contemplated that a separate 12 volt DC power source may be provided along with the scale 10 and may be mounted to the semi-trailer 14.

Typically, the air bag 14 contains about seven pounds of pressure per square inch (psi) when a semi-trailer 12 is not loaded. When a semi-trailer 12 is loaded to its maximum capacity, the air bag 14 compresses and the pressure within the air bag 14 increases to about sixty pounds of pressure. As such, there is a correlation between the weight of the load on the semi-trailer 12 with the air pressure in the air bag 14, which can be measured and correlated to the weight of the load on the semi-trailer 12.

The display panel 24 is designed to be sufficiently large such that it can be seen from a distance away from the semi-trailer 12 such that a person loading grain or other materials onto the semi-trailer 12, or other trailer, can easily view the actual amount of weight being placed in the semi-trailer 12. It is contemplated that the display panel 24 be digital having bright colors such that it is easily visible either during the day or at night. A contemplated size of the display panel 24 is about 10 inches wide by about 2 inches high, which can be seen from about 400 feet away. One such contemplated display module is Model No. LPAX-5 manufactured by Red Lion Controls located in York, Pa. In one embodiment, such a display has a five digit display panel displaying red LED digits approximately 1.5 inches in height, although different size and color displays are amenable to use with the embodiments described herein without departing from the scope of the disclosure.

In one embodiment, the process module 20, the display module 22 and the pressure transducer 18 are retained and secured within a sealed box 26 where all the components 18, 20 and 22 are placed with the sealed box 26, wired together and electrically coupled together at a manufacturing facility. The person utilizing the scale 10 would mount the scale 10 to the semi-trailer 12, connect the air line 16 from the air bag 14 to the pressure transducer 18 and supply power to the scale 10 from a power source, typically a twelve volt battery located on the semi-tractor. One such sealed box is Model No. HFP120 manufactured by Allied Molded Products, Inc. located in Bryan, Ohio.

The box 26 is sealed to protect the pressure transducer 18, the process module 20 and the display module 22 from dirt and debris and other wear and tear caused by use or travel. Further, the box 26 includes a lid 28 that is attached to the box 26 with a hinge 31 such that the display panel 24 can be covered and protected when the semi-trailer 12 is in transit. Also, the lid 28 includes a weather proof gasket 32 which prevents water and other debris from entering into the sealed box 26 once the lid 28 is secured in a closed position. The lid 28 includes a lock 34 which retains the lid 28 to the control box 26 when in transit.

Once the power supply and the air line 16 have been connected to the scale 10, the operator only has to cause an on/off switch 29 to be turned on which would allow the weight of a load to be displayed upon the display panel 24. Therefore the operator is provided with an easy to use scale 10 which does not require much if any maintenance.

An additional benefit of the scale 10 is that an operator will be able to determine whether or not the air bag 14 is leaking air. If air is leaking from the air bag 14, then the weight on the display panel 24 will appear to decrease even though the actual load within the semi-trailer will not have changed. In the event that the phenomenon occurs where the weight on the scale 10 decreases when the weight on the load does not change then the operator will know there is a leak in the air bag 14.

Calibration of a scale such as scale 10 is accomplished in one embodiment using a known pressure of air within the air bag 14 at a known (i.e., measured) low weight of the semi-trailer, such as an unloaded trailer, and a known (i.e., measured) pressure of air within the air bag 14 at a known (i.e., measured) high weight of the semi-trailer, such as a fully loaded trailer. A pressure transducer, such as pressure transducer 18 discussed above, measures the pressure in an air line attached to one or more air bags. The pressure measured is conveyed to the process module 20, which converts the received signal into a weight.

As has been discussed, the received signal in one embodiment is a current passed along a two wire process loop. Such loops typically provide a current in a range of 4-20 mA. In one embodiment, the pressure transducer is calibrated so that a lowest pressure is transmitted as a 4 mA signal, and the highest pressure is transmitted at a 20 mA signal. Therefore, 16 mA are usable for the range of pressures encountered. As an example of operation of the scale, using 80000 pounds as a full acceptable weight of a semi-trailer, and using an empty weight of 26800 pounds, and apportioning a full weight of 80000 pounds over a 16 mA range, each 1 mA increment can be assigned 5000 pounds (80000/16). Therefore, an empty trailer weighing 26800 pounds would be calibrated in the process module to the pressure reading of the empty trailer, and assigned a value of approximately 5.36 mA. A 99999 pound loaded trailer, to allow for overweight loads to be measured up to a total of 99999 pounds, would be calibrated in the process module to the pressure reading of a 99999 pound total weight, and assigned a value of approximately 19.99 mA.

Given a substantially linear relationship between pressure and weight at a nearly constant air temperature, any pressure reading between the pressure of the empty trailer and a 99999 pound loaded trailer may be made simply by multiplying the mA reading by 5000 to arrive at the weight. Therefore, a normal fully loaded trailer weighing 80000 pounds would have a signal generated at 16 mA. From this calibration, any trailer weight between 20000 pounds and 99999 pounds may be determined only using the pressure obtained from the pressure transducer calibrated to the 4-20 mA signal.

While a full weight acceptable load of 80000 pounds including the semi-trailer is described, it should be understood that different full weight loads and different empty weights of trailers are easily programmed to the pressure transducer and process module, and that such programming is within the scope of the disclosure. It should be understood that for each individual trailer, the pressure calibration can be made separately. That is, the empty weights of various trailers will be different depending upon the trailer itself. Any trailer using air bags, having a known weight, and measured with a maximum load, can use the embodiments of the present disclosure to correlate a pressure reading with a weight, and to display that weight on the display module as described herein.

Another way of calibrating the scale is to determine an empty weight and corresponding pressure in the air line, determine a full load weight and corresponding pressure in the air line, and assign a mA reading within the 20 mA range to each of the weights and pressures, for example 5 mA for the empty weight and pressure, and 16 mA for the full weight and pressure. This allows for some underweight determination and some overweight determination. In this example, presume the empty weight of a semi-trailer is 26800 pounds, and the weight of the semi-trailer and its load under a full load is 80000 pounds, as discussed above. Presume also that the empty weight pressure in the air line is 11 pounds per square inch (psi) and that the full load weight pressure is 69 psi. Given this, and given the substantially linear nature of pressure versus weight, a calibration can be made as follows. At 5 mA on the 4-20 mA scale, a pressure of 11 psi and a weight of 26800 pounds is supplied. At 16 mA on the 4-20 mA scale, a pressure of 69 psi and a weight of 80000 pounds is supplied. Each mA between 11 psi and 69 psi is therefore approximately 5.27 psi. Each mA between 26800 pounds and 80000 pounds is therefore approximately 4836 pounds. Therefore, for any pressure reading, it is converted to a mA reading, for example a pressure reading of 16.27 psi indicates a mA scale of the empty weight pressure reading of 5 mA plus 5.27 psi divided by the difference between the psi reading and 11 psi of the empty weight. That is 6 mA in this example. This 6 mA signal is provided by the pressure transducer process loop to the process module. This 6 mA signal received at the process module is converted to weight as follows. Knowing that 5 mA is equivalent to 26800 pounds, and knowing that for each additional mA, another 4836 pounds is added, a 6 mA signal indicates a weight of 26800 pounds plus the difference between the mA reading and 5 mA time 4836 pounds, or in this example, 30686 pounds.

The process module 18 receives in one embodiment the mA current on the process loop from the pressure transducer, converts it according to the determined readings by multiplying the mA reading by the per mA factor (in the example, 5000), to obtain the weight of the trailer and its load. This weight is displayed on the display module in real time, so that an operator or user can see instantaneously what the weight of the trailer and load is. This is advantageous in a number of circumstances, including but not limited to situations in which a traditional scale is not present or available, such as in a field or other location where crops and other materials are being loaded to the trailer. In a situation in which crops are being loaded, for example, the moisture content of the crops may be higher or lower than a normal content depending upon the time of year, the amount of time since harvesting, and any number of other factors. While estimation may be used to approximate the weight of a load, over- or under-estimating the load can be problematic. A load that is too heavy may result in an illegal weight, and tickets and fines for the overweight load. A load that is lighter than the allowed maximum can lead to inefficiencies in transport. As the margin for profitability in trucking continues to decrease, every advantage is important.

In one embodiment, the display module has a large display, that is mounted in a location visible to an operator or loader, such as on a side of the trailer near an axle. However, the placement of the display may be modified without departing from the scope of the disclosure. For example, a display may be located in the cab of a tractor, on the rear of the trailer. Additionally, in one embodiment, multiple displays may be used, communicating with each other to each display the weight. Communication between multiple displays may be over a wired connection, a wireless connection, or the like. The large display is especially useful in a situation where an amount of load cannot be accurately gauged due to its nature, such as crops, and where the loader or operator may be located a distance from the display. In one embodiment, the display is large enough that it can be accurately read at distances of 400 feet or more. It should be understood that the size of the display on the display module may be chosen to be larger or smaller depending upon its potential uses, and that larger or smaller displays may be substituted without departing from the scope of the disclosure. Further, the display module may have, in one embodiment, a choice of the display size that an operator may choose.

While embodiments of the present disclosure have been described using wired connections between the various components such as the pressure transducer 16, the process module 18, and the display module 20, it should be understood that other connections, such as wireless connections, may be made between one or more of the components without departing from the scope of the disclosure.

The methods and apparatus describe herein may be used in another embodiment to provide an axle weight for one or more axles of a semi-trailer. This is advantageous for load leveling as well as for per-axle weight limits that are also in effect on some roads. In this embodiment, each air bag of a semi-trailer has its own individual air line. The individual air lines are combined in other embodiments described herein into a main air line. However, making a pressure reading at each individual air line, or at a combined air line for each axle or each side of an axle, then selecting from which air line pressure is measured, allows in another embodiment the determination of a weight allocated per air bag or per axle or axle side. For each air bag of an axle, then, the pressure may be summed to provide a total weight on the axle. For example, if an axle has two air bags, the pressure on each air bag may be determined, processed as a total air pressure is processed above, and translated into a weight on the axle. All that differs from the process for determining the total weight given all air bags is the calibration of the process module to account for a different scale of values for a provided current on the two wire process loop.

In another embodiment, an amperage signal indicating pressure in the air bag is distributed over the usable interval of amperage in the 4-20 milliAmp loop. Pressure in the air bag is substantially linear over short time periods (temperature change will affect pressure under the formula $PV=nRT$). Using a baseline pressure reading with the trailer empty, and a high-side pressure reading with a maximum weight on the scale of amperage, and using a linear value for pressure between the baseline pressure and the high-side pressure, calibration may be accomplished based on pressure in a common air line for the total weight of the load on the trailer as a combination of the pressure of the air line feeding all air bags. A semi-trailer may have two air bags per axle, or may have three axles with two air bags per axle. The pressure in the common line is in one embodiment a combination of all the pressures of the individual air bags combined. However, for this embodiment as well, individual air bags or combinations of air bags may be used to measure different parameters, such as per-axle, or per-side weight distributions as desired.

Figure 4:
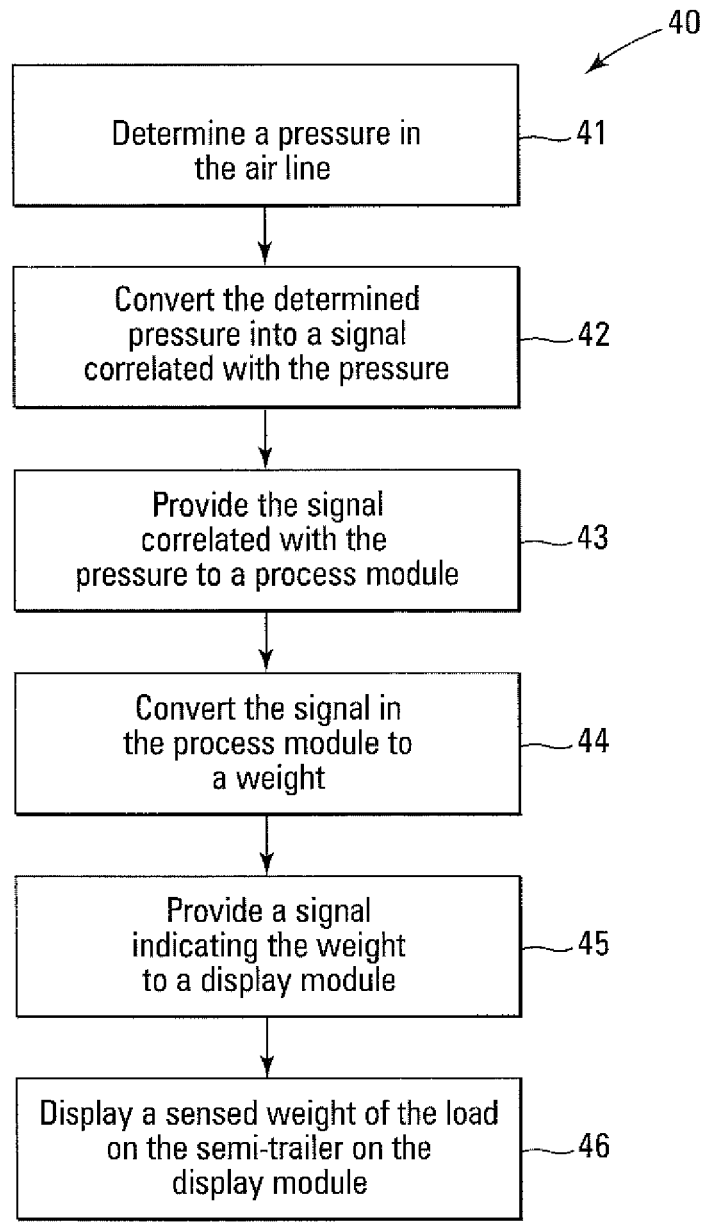
FIG. 4 is a flow chart diagram of a method according to an embodiment of the present disclosure.

A method 40 of determining a weight of a load on a semi-trailer having an air bag and an air line operatively connected to the air bag is shown in flow chart form in FIG. 4. Method 40 comprises, in one embodiment, determining a pressure in the air line in block 41, converting the determined pressure into a signal correlated with the pressure in block 42, providing the signal correlated with the pressure to a process module in block 43, converting the signal in the process module to a weigh in block 44, providing a signal indicating the weight to a display module in block 45, and displaying a sensed weight of the load on the semi-trailer on the display module in block 46.

The method may further comprise in another embodiment calibrating the process module according to an empty weight of the semi-trailer and to a fully loaded weight of the semi-trailer. Such calibrating comprises in one embodiment, assigning a value within a 4-20 mA range of a process loop, the values based on pressure of the air line, the values within the range including the empty weight of the semi-trailer and the fully loaded weight of the semi-trailer. A value within the range is used to determine the weight of the semi-trailer and the load.

Figure 5:
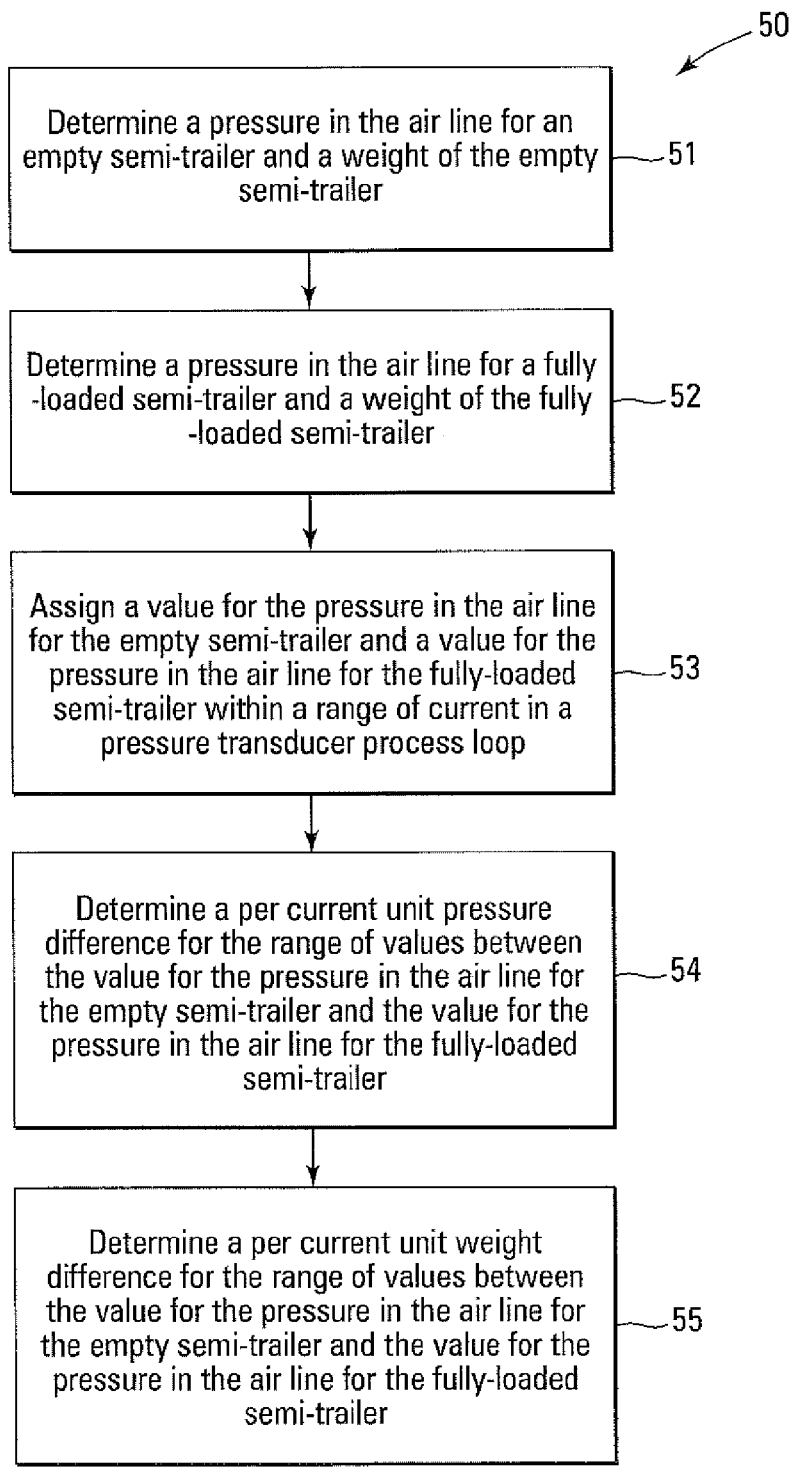
FIG. 5 is a flow chart diagram of a method according to another embodiment of the present disclosure.

Alternatively, a method 50 of calibrating is shown in flow chart form in FIG. 5. Method 50 comprises, in one embodiment, determining a pressure in the air line for an empty semi-trailer and a weight of the empty semi-trailer in block

51, determining a pressure in the air line for a fully loaded semi-trailer and a weight of the fully loaded semi-trailer in block 52, assigning a value for the pressure in the air line for the empty semi-trailer and a value for the pressure in the air line for the fully-loaded semi-trailer within a range of current in a pressure transducer process loop in block 53, determining a per current unit pressure difference for the range of values between the value for the pressure in the air line for the empty semi-trailer and the value for the pressure in the air line for the fully-loaded semi-trailer in block 54, and determining a per current unit weight difference for the range of values between the value for the pressure in the air line for the empty semi-trailer and the value for the pressure in the air line for the fully-loaded semi-trailer in block 55.

Converting the signal in the process module to a weight comprises in one embodiment dividing a range of pressures in the air line into a range of values for the signal correlated with the pressure in a pressure transducer, and translating the signal correlated with the pressure using the range of values for the signal correlated with the pressure multiplied by a per-unit conversion for the range of values.

Determining pressure in the air line comprises in one embodiment connecting the air line to a pressure transducer, and determining a pressure in the air line with the pressure transducer. Alternatively, determining a pressure in the air line further comprises in one embodiment connecting the air line to a plurality of air bags, each air bag of the plurality of air bags associated with one axle of the semi-trailer, and combined into a single air line.

Figure 6:
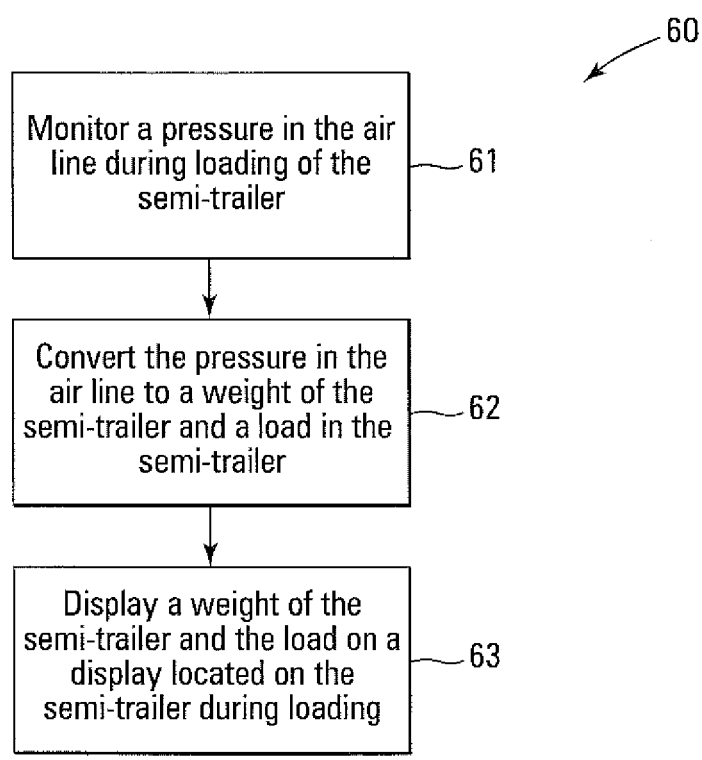
FIG. 6 is a flow chart diagram of a method according to yet another embodiment of the present disclosure.

A method 60 of loading a semi-trailer having an air bag in the suspension and an air line connected to the air bag is shown in flow chart form in FIG. 6. Method 60 comprises in one embodiment, monitoring a pressure in the air line during loading of the semi-trailer in block 61, converting the pressure in the air line to a weight of the semi-trailer and a load in the semi-trailer in block 62, and displaying a weight of the semi-trailer and the load on a display located on the semi-trailer during loading in block 63. Monitoring is in one embodiment is performed with a scale including a pressure transducer configured for connecting to the air line and for measuring the pressure in the air bag, and configured to send a signal correlated to the sensed pressure, a process module in electric communication with the pressure transducer and configured to receive the signal therefrom wherein the process module is configured to correlate the signal from the pressure transducer to a weight of a load on the trailer, and a display module configured to receive a signal from the process module indicating the sensed weight and display the sensed weight of the load on the semi-trailer. Use of the method of this embodiment, as well as the methods of other embodiments, allows monitoring a weight of the semi-trailer and the load in real-time to prevent overweight and/or underweight loading.

Although the present invention has been described with reference to preferred embodiments, workers skilled in the art will recognize that changes may be made in form and detail without departing from the scope of the invention.

The invention claimed is:

1. A scale for mounting on a semi-trailer having an air bag in the suspension and an air line connected to the air bag, the scale comprising:
 a pressure transducer configured for connecting to the air line and for measuring the pressure in the air bag, and configured to send a signal correlated to the sensed pressure;
 a process module in electric communication with the pressure transducer and configured to receive the signal therefrom wherein the process module is configured to correlate the signal from the pressure transducer to a weight of a load on the trailer independent of whether the semi-trailer is connected to a prime mover;
 a display module configured to receive a signal from the process module indicating the sensed weight and display the sensed weight of the load on the semi-trailer wherein the display module is of a size shape and brightness to be visible at a distance of approximately 400 feet; and
 a compartment having a housing sized to contain and configured to protect the pressure transducer, the process module, and the display module, the compartment mountable to the semi-trailer, and having a display window fixed attached to the housing through which the display module is visible.

2. A method of determining weight of a load on a semi-trailer having an air bag and an air line operatively connected to the air bag, the method comprising:
 providing the semi-trailer;
 determining a pressure in the air line;
 converting the determined pressure into a signal correlated with the pressure;
 providing the signal correlated with the pressure to a process module;
 converting the signal in the process module to a weight;
 providing a signal indicating the weight to a display module;
 displaying a sensed weight of the load on the semi-trailer on the display module that is visible at a distance of approximately 400 feet through a window in a compartment attached to the semi-trailer such that a person loading the semi-trailer can view the weight of the load in the trailer to ensure that the semi-trailer is not overloaded; and
 connecting the semi-trailer to a prime mover.

3. The method of claim 2, wherein determining a pressure in the air line further comprises connecting the air line to a plurality of air bags, each air bag of the plurality of air bags associated with one axle of the semi-trailer, and combined into a single air line.

4. The method of claim 2, wherein determining pressure in the air line comprises connecting the air line to a pressure transducer, and determining a pressure in the air line with the pressure transducer.

5. The method of claim 2, and further comprising:
 calibrating the process module according to an empty weight of the semi-trailer and to a fully loaded weight of the semi-trailer.

6. The method of claim 5, wherein calibrating further comprises:
 assigning a value within a 4-20 milliAmpere range of a process loop, the values based on pressure of the air line, the values within the range including the empty weight of the semi-trailer and the fully loaded weight of the semi-trailer.

7. The method of claim 6, wherein a value within the range is used to determine the weight of the semi-trailer and the load.

8. The method of claim 2, wherein converting the signal in the process module to a weight comprises:
 dividing a range of pressures in the air line into a range of values for the signal correlated with the pressure in a pressure transducer; and translating the signal correlated with the pressure using the range of values for the signal correlated with the pressure multiplied by a per-unit conversion for the range of values.

9. The method of claim 2, and further comprising calibrating the scale, wherein calibrating comprises:
determining a pressure in the air line for an empty semi-trailer and a weight of the empty semi-trailer;
determining a pressure in the air line for a fully loaded semi-trailer and a weight of the fully loaded semi-trailer;
assigning a value for the pressure in the air line for the empty semi-trailer and a value for the pressure in the air line for the fully-loaded semi-trailer within a range of current in a pressure transducer process loop;
determining a per current unit pressure difference for the range of values between the value for the pressure in the air line for the empty semi-trailer and the value for the pressure in the air line for the fully-loaded semi-trailer; and
determining a per current unit weight difference for the range of values between the value for the pressure in the air line for the empty semi-trailer and the value for the pressure in the air line for the fully-loaded semi-trailer.

10. The method of claim 9, wherein the range of values of the pressure transducer process loop is assigned between 4-20 mA.

11. A method of loading a semi-trailer having an air bag in the suspension and an air line connected to the air bag, the method comprising:
providing the semi-trailer
monitoring a pressure in the air line during loading of the semi-trailer;
converting the pressure in the air line to a weight of the semi-trailer and a load in the semi-trailer;
displaying a weight of the semi-trailer and the load on a display located on the semi-trailer during loading that is visible at a distance of approximately 400 feet through a window in a compartment attached to the semi-trailer such that a person loading the semi-trailer can view the weight of the load in the trailer to ensure that the semi-trailer is not overloaded; and
attaching the semi-trailer to a prime move for transporting the load on the semi-trailer.

12. The method of claim 11, wherein monitoring is performed with a scale including a pressure transducer configured for connecting to the air line and for measuring the pressure in the air bag, and configured to send a signal correlated to the sensed pressure, a process module in electric communication with the pressure transducer and configured to receive the signal therefrom wherein the process module is configured to correlate the signal from the pressure transducer to a weight of a load on the trailer, and a display module configured to receive a signal from the process module indicating the sensed weight and display the sensed weight of the load on the semi-trailer.

13. The method of claim 11, and further comprising monitoring a weight of the semi-trailer and the load in real-time to prevent overweight and/or underweight loading.

14. The scale of claim 1 and further comprising:
a lid hingedly attached to the compartment wherein the lid is positionable into a first position where the display is visible through the window and a second position where the lid covers and protects the window.

15. The scale of claim 14 and further comprising:
a gasket positioned within the lid and configured to create a seal between the lid and the compartment when the lid is in the second position.

* * * * *